Figure 1A:
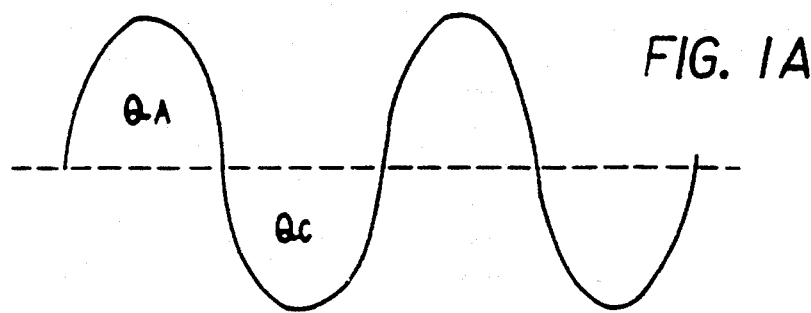

United States Patent [19]

Shige et al.

[11] Patent Number: 5,437,779

[45] Date of Patent: Aug. 1, 1995

[54] METHOD OF MAKING A MAGNETIC RECORD MEDIUM

[75] Inventors: Tomoo Shige; Yasushi Makabe; Masataka Yokoyama, all of Kurashiki, Japan

[73] Assignee: Mitsubishi Chemical Corporation, Tokyo, Japan

[21] Appl. No.: 163,551

[22] Filed: Dec. 9, 1993

[30] Foreign Application Priority Data

Dec. 11, 1992 [JP] Japan .................................. 4-331665

[51] Int. Cl.$^6$ .............................................. C25D 5/34
[52] U.S. Cl. ................................. 205/106; 204/192.2; 205/201; 205/206; 205/214; 205/219; 427/129
[58] Field of Search ............... 205/206, 214, 219, 198, 205/199, 200, 201, 106, 107; 204/192.2; 427/129

[56] References Cited

U.S. PATENT DOCUMENTS 5,057,200 10/1991 Lal et al. ........................ 204/192.15
5,223,304 6/1993 Yasuda et al. ...................... 427/129

FOREIGN PATENT DOCUMENTS 1188695 7/1989 Japan .

OTHER PUBLICATIONS

Lowenheim, Anodizing Aluminum, *Electroplating*, pp. 452–461 (1978) [no month].
Graham, Conversion Coating Process, *Electroplating Engineering Handbook*, 3rd edition, pp. 456–464 (1971) [no month].

*Primary Examiner*—John Niebling
*Assistant Examiner*—Edna Wong
*Attorney, Agent, or Firm*—Oblon, Spivak, McClelland, Maier & Neustadt

[57] ABSTRACT

A method of making a-magnetic record medium comprising the steps of: texturing a surface of a substrate by a first surface treatment; electrolyzing the surface of the textured substrate in an electrolyte of an acidic solution by applying an electric potential on the nonmagnetic substrate by a second surface treatment; and forming an undercoating layer and a magnetic layer on the surface of the electrolyzed substrate.

17 Claims, 1 Drawing Sheet

METHOD OF MAKING A MAGNETIC RECORD MEDIUM

The present invention relates to a method of making a magnetic record medium, particularly to a method of making a magnetic record medium wherein surface treatment on a substrate is performed in a short time, and which is excellent in a magnetic head flying characteristic, lubricity and wear resistance as a result of improving a surface characteristic.

In recent years, with the progress in the information processing technology such as a computer, a magnetic record medium such as a magnetic disk is employed as an outer memory device thereof.

Conventionally, a magnetic record medium has been employed wherein a plating of a nonmagnetic layer as almite layer forming or a Ni—P plating is performed on an aluminum alloy substrate, and undercoating layer of chromium or the like is coated, a magnetic thin layer of a cobalt series alloy is coated, and a carbonaceous protective film is coated, in this order.

With a tendency of high density in the above magnetic record medium (magnetic disk), an interval between a magnetic disk and a magnetic head, that is, a flying height of the magnetic head is becoming smaller and smaller, in recent times, to be approximately 0.15 $\mu$m or less. Since the flying height of the magnetic head is considerably small, when there are protrusions on the surface of the magnetic disk, a head crash is induced, and the surface of the disk is impaired. Further, even in case of very small protrusions that do not induce the head crash, they may cause various errors in reading and writing informations.

On the other hand, the downsizing of the magnetic disk is promoted, in parallel with the capacity expansion and the high density, and a motor for rotating a spindle and the like are becoming smaller and smaller. Therefore, the torque of the motor is getting deficient, and a phenomenon is apt to cause wherein the magnetic head remains fixed to the surface of the magnetic disk and does not fly up. There has been performed a surface treatment (called texturing) as a means for preventing the fixing of the magnetic head by minimizing the contact between the magnetic head and the surface of the magnetic disk, wherein fine grooves are formed on the surface of the substrate of the magnetic disk.

However, although there has been an improvement in the flying characteristic of the magnetic head on the textured magnetic disk, the improvement is not sufficient. Further, it is proposed in Japanese Unexamined Patent Publication No. 95221/1992, to perform a chemical etching after cleaning, followed by the texturing.

However, in the method by the chemical etching, it is difficult to control the state of the surface to be worked by the selection of the etching conditions, the etched surface is apt to be nonuniform, and local corrosions are apt to generate. Therefore, a satisfactory surface state is yet to be provided and a further improvement in the flying characteristic of the magnetic head on the magnetic disk is desired.

As a result of an intensive study to further improve the flying characteristic of the magnetic head on the magnetic disk, the inventors have finished the present invention whereby the above purpose is achieved by texturing the surface of the substrate and subsequently by electrolyzing the textured surface of the substrate by an acidic electrolyte.

According to the aspect of the present invention, there is provided a method of making a magnetic record medium comprising the steps of:

texturing a surface of a substrate by a first surface treatment;

electrolyzing the surface of the textured substrate in an electrolyte of an acidic solution by applying an electric potential on the nonmagnetic substrate by a second treatment; and forming an undercoating layer and a magnetic layer on the surface of the electrolyzed substrate.

Figure 1B:
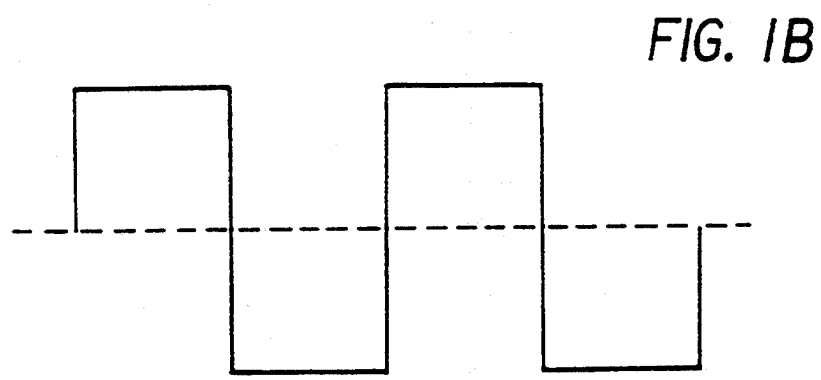
Figure 1C:
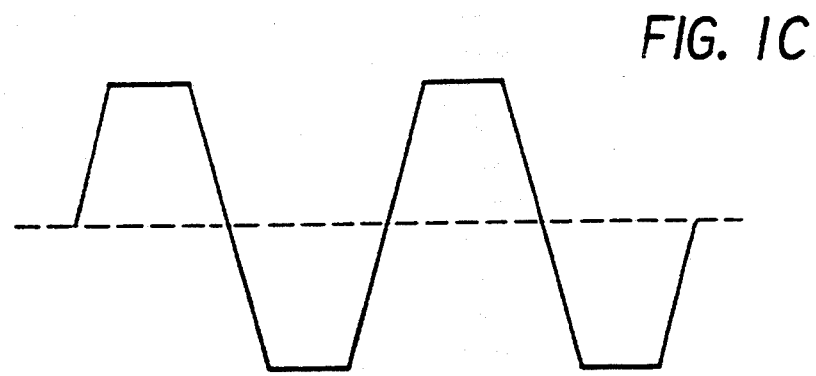
Figure 1D:
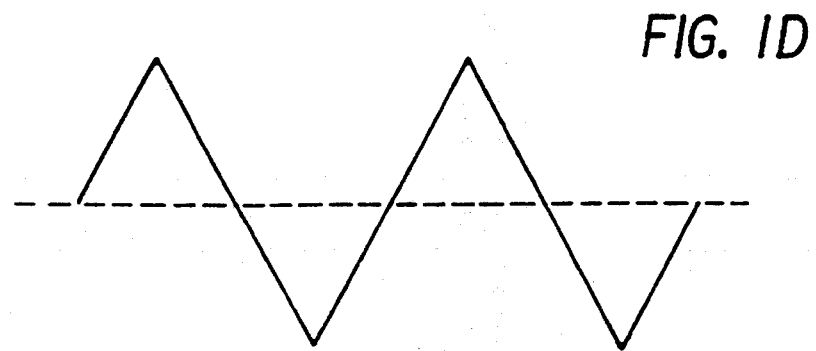

In the drawing;

FIGS. 1(A) through 1(D) show examples of alternating waveform currents employed in the present invention, wherein FIG. 1(A) designates a sinusoidal waveform, FIG. 1(B), a rectangular waveform, FIG. 1(C), a trapezoidal waveform, and FIG. 1(D), a triangular waveform.

A further detailed explanation will be given of the present invention as follows.

As a nonmagnetic substrate for a magnetic record medium in the present invention, a disk-like substrate generally made of an aluminum alloy is employed, which is worked into a predetermined thickness, and the surface of which is mirror-finished, and a surface layer having a film thickness of approximately 5 through 20 $\mu$m is formed thereon by an electroless plating of a Ni—P alloy or Ni—Cu—P alloy. Next, a surface treatment is performed on the surface layer of the substrate, thereby forming a surface-finished layer to a predetermined surface roughness. In the present invention, as the surface finishing, texturing is performed on a nonmagnetic substrate, and the surface of the textured substrate is electrolyzed in an electrolyte of an acidic solution by applying an electric potential on the substrate. It is general to perform the texturing on the surface layer of the substrate which has been polished. In the polishing, for instance, the substrate is interposed between polish pads adhered and embedded with free abrasive grains on their surfaces, and the polishing is performed by supplying a polishing solution such as an aqueous solution of a surfactant, normally by the thickness of approximately 2 through 5 $\mu$m, thereby mirror-finishing the surface with the mean surface roughness Ra of 50 Å or less, preferably 30 Å or less. As the free abrasive grains, in a representative case, an alumina group slurry of polipla 700 or polipla 103 (both are registered Trade Marks of Fujimi Co.), a diamond group slurry, a SiC group slurry or the like is employed. As a polish pad, in a representative case, urethane foam of Surfin 100 or Surfin XXX-5 (both are registered Trade Marks of Fujimi Co.) or the like is employed.

Further, as the texturing, for instance, a polishing tape which carries alumina abrasive grains of approximately 2500 through 6000#, is pressed on the surface of the substrate which has been finished with the polishing, by a work roller thereby accurately working fine grooves or protrusions and recesses such that the mean surface roughness Ra is not smaller then 20 Å, preferably in a range of 30 through 300 Å, more preferably 30 through 150 Å in the circumferential direction of the substrate. Owing to this texturing, the fixing of the magnetic head to the magnetic record medium can be prevented, the CSS (Contact Start and Stop) characteristic is improved and the magnetic anisotropy is excellent.

In this invention, the textured surface of the substrate is electrolyzed in an electrolyte of an acidic solution by applying an electric potential on the substrate. As an electrolyte, for instance, an aqueous solution of at least one selected from the group consisting of sulfuric acid, nitric acid, hydrochloric acid, chromic acid, phosphoric acid, oxalic acid, and acetic acid in a range of concentration of 0.5 through 40 weight %, preferably 1 through 30 weight %, and particularly phosphoric acid is preferable. As for the electrolytic conditions, it is preferable that the substrate is treated wherein an electric potential is applied on the substrate in the electrolyte, the solution temperature is in a range of 10° through 70° C., the current density is in a range of 0.1 through 50 mA/cm$^2$, preferably 0.5 through 45 mA/cm$^2$, more preferably 1.0 through 20 mA/cm$^2$, the electrolytic time is in a range of 1 through 400 seconds, preferably 2 through 200 seconds, and the quantity of electricity (a product of current density by electrolytic time) is in a range of 10 through 1000 mA·second/cm$^2$, preferably 50 through 600 mA·second/cm$^2$. The electric potential applied in the electrolysis reaction is a direct current or an alternating waveform current wherein the polarities are alternately reversed, and especially the alternating waveform current is preferable. When a direct current potential is employed, it is preferable to perform the treatment with current density in a range of 1.0 through 25 mA/cm$^2$. The alternating waveform current is provided by alternately reversing (converting) the positive and negative polarities, that is, the polarities of anode and cathode, which is, for instance, a single phase alternating current of a sinusoidal wave, a three-phase alternating current of a sinusoidal wave, a rectangular wave, a triangular wave, a trapezoidal wave or the like. The frequency of the alternating waveform current is not smaller than 0.1 and smaller than 500 Hz, preferably in a range of 0.1 through 300 Hz, more preferably in a range of 0.5 through 200 Hz. Further, it is preferable to select a ratio ($Q_a/Q_c$) of the quantity of electricity in anode time ($Q_a$) over the quantity of electricity in cathode time ($Q_c$) in case of employing the alternating waveform current, is in a range of 0 through 2.0, preferably 0.8 through 1.5, more preferably 0.9 through 1.1.

In the direct current electrolysis reaction, the substrate is always on the anode side, and an anode oxidation is caused simultaneously with the dissolving reaction of Ni—P on the surface of the substrate. On the other hand, when the substrate is electrolyzed by applying the alternating waveform current, the substrate is alternately on the side of the anode, and on the side of the cathode in accordance with the power waveform. The anode oxidation reaction is caused simultaneously with the dissolving reaction of Ni—P on the surface of the substrate in its anode time and a reaction generating hydrogen gas is caused on the surface of the substrate in its cathode time. That is, in case of the alternating current waveform electrolysis reaction, oxygen generated on the surface of the substrate in the anode time is consumed by hydrogen generated on the surface of the substrate in the cathode time, and therefore, the surface of the substrate is hard to oxidize. Further, a stirring of a viscous layer (which is presumed to be a saturated solution of a nickel phosphate) is caused in the vicinity of the surface of substrate by bubbling by the hydrogen gas generated in the cathode time, which accelerates to make uniform an etching rate on the surface of the substrate, and a cleaning effect over the surface of the substrate by the bubbling can be expected.

By the above electrolysis reaction, protrusions, burrs and the like on the textured surface of the substrate are removed by the etching, the surface of the substrate is smoothed and the flying characteristic and the CSS characteristic are considerably improved. Especially, in case of employing the alternating waveform current, in addition to the above improvements, the generation of pitting corrosion on the surface of the substrate can be restrained, and the magnetic property such as coercive force is also promoted, which is preferable.

Further, it is preferable to perform a finishing treatment on the surface, wherein, after finishing the electrolytic etching, and before laminating the undercoating layer and the magnetic layer, if necessary, the texturing treatment is again performed whereby a cloth in which free abrasive grains are adhered and embedded on the surface of a substrate such as cellulose nonwoven fabric, or a tape carrying comparatively fine abrasive grains of alumna or the like, is pressed on the surface of the substrate.

A second undercoating layer is formed on the surface of the substrate which has been electrolyzed, by sputtering chromium. Normally, the film thickness of the chromium undercoating layer is in a range 50 through 2000 Å.

As a metallic magnetic thin film layer formed on such a chromium undercoating layer of the substrate, a magnetic thin film layer of Co—Cr, Co—Ni, Co—Cr—X, Co—Ni—X, Co—W—X or the like, is preferable, wherein X is an element or elements of at least one selected from the group consisting of Li, Si, Ca, Ti, V, Cr, Ni, As, Y, Zr, Nb, Mo, Ru, Rh, Ag, Sb, Hf, Ta, W, Re, Os, Ir, Pt, Au, La, Ce, Pr, Nd, Pm, Sm and Eu.

The metallic magnetic thin layer made of such a cobalt series alloy, is formed on the undercoating layer of the substrate, normally by means of sputtering or the like. The film thickness of the metallic film thin layer is normally in a range of 100 through 1000 Å.

As the protective thin film layer formed on the metallic thin film layer, a carbonaceous film is preferable. The carbonaceous protective thin film layer is normally formed on the metallic magnetic thin film layer by sputtering with a target of diamond-like, graphite-like or amorphous carbon under the atmosphere of a rare gas such as argon or helium. The film thickness of protective thin film layer is normally in a range of 50 through 500 Å. A lubricating film may further be formed on the protective thin film layer to reduce the coefficient of friction.

The magnetic record medium which is excellent in the flying characteristic, the lubricity and the wear resistance can be provided by performing the surface treatment on the substrate by the invented method. Accordingly, its industrial value of utilization is excellent.

EXAMPLES

Next, a further specific explanation will be given of the present invention by Examples. However, this invention is not limited to the following Examples, so far as it does not exceeds the gist of invention.

Examples 1–8

The surface of an aluminum alloy disk-like substrate coated with a Ni—P plating by the electroless plating method by the thickness of approximately 15 μm, was polished to a film surface having the surface mean roughness (Ra) of approximately 20 through 30 Å, and fine grooves were formed by a texturing operation in use of a polish tape, providing the surface mean roughness (Ra) of approximately 100 Å in Examples 1 through 5 and approximately 70 Å in Example 6 through 8. Next, the disk-like substrate was electrolyzed by a direct current, in an aqueous solution of acid, under the conditions shown in Table 1. Further, a finishing treatment was performed wherein a texturing in use of free abrasive grain was performed on the disk. The surface mean roughness of the disk is shown in Table 2. Next, a magnetic disk was manufactured by successively sputtering a general chromium undercoating layer, a magnetic layer of Co—Cr—Ta alloy and a protective film of a carbonaceous material on the surface layer of the substrate, in this order. The surface mean roughness, the glider flying characteristic, the CSS characteristic, the surface configuration and the coercive force were evaluated with respect to the magnetic disk by the following method. The result is shown in Table 2.

Comparative Example 1

A magnetic disk was manufactured similar to Examples 6 through 8 except that the electrolysis reaction was not performed in an acidic solution. The result of evaluation of the respective characteristics is shown in Table 2.

The method of evaluation (Examples 1–8 and Comparative Example 1)

① Surface mean roughness (Ra);

The surface mean roughness (Ra) was measured by a surface roughness meter ("ET-30HK by Kosaka Kenkyusho) having a stylus with the distal end of a cone of 0.5 μm radius with respect to the length of measurement of 250 μm. In the method of measuring, the surface mean roughness (Ra) was measured with respect to an arbitrary linear surface in the radial direction of a peripheral portion on the substrate.

② Glider flying characteristic;

The glider flying characteristic was evaluated by detecting collision between a magnetic head and protrusions of the magnetic disk, as an outer magnetic head flying height, by a PZT element in use of RX-2000 made by Hitachi DECO.

③ CSS (Contact Start and Stop) characteristic;

The CSS characteristic was evaluated by the static coefficient of friction between the magnetic head and magnetic disk after 20,000 times of CSS, wherein the magnetic disk was integrated to an actual disk drive and the start and stop were repeated.

④ Surface configuration;

The surface configuration was evaluated by an optical observation after taking photographs with the magnifications of 5,000 and 10,000, in use of a scanning electron microscope SEM (JSM-5400 made Nihon Denshi).

In the evaluation of the surface configuration, the grade of evaluation is A in case wherein the burrs were completely removed by etching, B in case wherein the burrs were incompletely removed and the surface showed a rugged structure, and C in case wherein the burrs were not removed and present in a great number.

⑤ Coercive force;

The coercive force was evaluated at a position 33 mm away from the center of the disk, in use of a B-H meter (GHZ-2 made of GLORY INDUSTRY).

Example 9–17

The surface of an aluminum alloy disk-like substrate coated with Ni—P plating by the electroless plating method by the thickness of approximately 15 μm, was polished into a film surface having the surface mean roughness (Ra) of approximately 20 through 30 Å, and fine grooves were formed by a texturing operation in use of a polish tape. Further, the disk underwent the texturing operation in use of abrasive grains, to the surface mean roughness (Ra) of approximately 60 Å. Next, the disk-like substrate was electrolyzed in an aqueous solution of 10 weight % phosphoric acid by applying an electric potential to form an alternating waveform current shown by the rectangular wave (B) in FIG. 1(B), or a direct current (Examples 15 through 17), at a temperature of the electrolyte of 20° C. under the conditions shown in Table 3. Next, a magnetic disk was manufactured by sputtering a general chromium undercoating layer, a magnetic layer made of Co—Cr—Ta alloy and a protective film composed of a carbonaceous film, on the surface layer of the substrate in this order. The surface configuration, the glider flying characteristic and the coercive force of the disk were evaluated by the following method. The result is shown in Table 4.

Comparative Example 2

A magnetic disk was manufactured similar to Examples 9 through 17 except that the application of potential was not performed. The result of evaluation of the respective characteristics is shown in Table 4.

Comparative Example 3

A magnetic disk was manufactured similar to Comparative Example 2 except that the immersion into an aqueous solution of a phosphoric acid was not performed. The result of the evaluation of the respective characteristics is shown in Table 4.

Method of evaluation of Examples 9–17 and Comparative Example 2 and 3)

① Observation of surface configuration (Surface mean roughness Ra, Peak count $P_c$ and SEM evaluation)

The surface mean roughness was evaluated by the same method of Examples 1–8 and Comparative Example 1.

A count level was provided in parallel with a center line of a roughness curve on the upper side of the center line apart from the center line by 200 Å, peak counts were measured in the measurement length of 250 μm, by a surface roughness meter (ET-30HK made by Kosaka Kenkyusho) having a stylus with a cone of 0.5 μm in radius at its end, which was defined as $P_c 200$. Further, the evaluation by a SEM was performed similar to the evaluation method in Examples 1 through 8 and Comparative Example 1.

② Glider flying characteristic;

The glider flying characteristic was evaluated by detecting collision between a magnetic head and protrusions of the magnetic disk by a PZT element in use of RG550 made by Hitachi DECO, as a flying height of the outer magnetic head.

③ Coercive force;

The coercive force was evaluated by the same method of Examples 1–8 and Comparative Example 1.

Further, the surfaces of the disks provided by Examples 9 through 17 were observed by a scanning microscope SEM (JSM-400 made by Nihon Denshi) with the magnifications of 5,000 and 10,000, thereby evaluating the occurrence of pits.

The pits were not observed in the disks provided by Examples 9 through 14 wherein the electrolysis reaction was performed by applying an electric potential to form an alternating waveform current. Further, the numbers of pits observed on the disks provided by Examples 15 through 17, wherein the electrolysis reaction was performed by applying an electric potential to form a direct current, are as follows.

Example 14; 13 pieces/100 $\mu m^2$
Example 15; 3 pieces/100 $\mu m^2$
Example 16; 2 pieces/100 $\mu m^2$

TABLE 1

| | Acidic aqueous solution | | Electrolysis | |
|---|---|---|---|---|
| | Kind | Concentration (weight %) | Current density (mA/cm$^2$) | Electrolytic time (second) |
| Example 1 | Phosphoric acid | 20 | 4 | 45 |
| Example 2 | Phosphoric acid | 10 | 2 | 45 |
| Example 3 | Phosphoric acid | 2 | 4 | 60 |
| Example 4 | Acetic acid | 20 | 1 | 180 |
| Example 5 | Hydrochloric acid | 5 | 3 | 20 |
| Example 6 | Phosphoric acid | 10 | 2 | 100 |
| Example 7 | Phosphoric acid | 10 | 10 | 20 |
| Example 8 | Phosphoric acid | 10 | 25 | 8 |
| Comparative Example 1 | — | — | none | none |

TABLE 2

| | Surface mean roughness Ra (Å) | Glider flying characteristic ($\mu m$) | CSS characteristic (coefficient of friction) | SEM evaluation | Coercive force (Oe) |
|---|---|---|---|---|---|
| Example 1 | 109 | 0.051 | 0.30 | A | — |
| Example 2 | 96 | 0.047 | 0.37 | A | — |
| Example 3 | 92 | 0.048 | 0.34 | A | — |
| Example 4 | 99 | 0.051 | 0.29 | A | — |
| Example 5 | 92 | 0.054 | 0.33 | A | — |
| Example 6 | 81 | 0.051 | — | A | 1426 |
| Example 7 | 72 | 0.041 | — | A | 1351 |
| Example 8 | 77 | 0.055 | — | A | — |
| Comparative Example 1 | 89 | 0.073 | 0.60 | C | 1436 |

TABLE 3

| No. | Concentration of phosphoric acid aqueous sol. (weight %) | Electrolysis Current density (mA/cm$^2$) | Frequency (Hz) | Treating time (second) |
|---|---|---|---|---|
| Example 9 | 10 | 10 | 0.5 | 23 |
| Example 10 | 10 | 5 | 50 | 65 |
| Example 11 | 10 | 10 | 50 | 23 |
| Example 12 | 10 | 45 | 50 | 5 |
| Example 13 | 10 | 10 | 100 | 40 |
| Example 14 | 10 | 10 | 200 | 60 |
| Example 15 | 10 | 2 | 0 (d.c.) | 100 |
| Example 16 | 10 | 10 | 0 (d.c.) | 20 |
| Example 17 | 10 | 30 | 0 (d.c.) | 7 |
| Comparative Example 2 | 10 | — | — | 300 |

TABLE 3-continued

| No. | Concentration of phosphoric acid aqueous sol. (weight %) | Electrolysis Current density (mA/cm$^2$) | Frequency (Hz) | Treating time (second) |
|---|---|---|---|---|
| Comparative Example 3 | — | — | — | — |

TABLE 4

| No. | Surface configuration Ra (Å) | P$_c$200 (piece) | SEM evaluation | Glider flying characteristic ($\mu m$) | Coercive force (Oe) |
|---|---|---|---|---|---|
| Example 9 | 63 | 3 | A | 0.026 | 1250 |
| Example 10 | 62 | 1 | A | 0.027 | 1607 |
| Example 11 | 63 | 1 | A | 0.026 | 1588 |
| Example 12 | 70 | 3 | A | 0.034 | 1465 |
| Example 13 | 61 | 1 | A | 0.029 | 1511 |
| Example 14 | 69 | 2 | A | 0.034 | 1469 |
| Example 15 | 64 | 1 | A | 0.033 | 1477 |
| Example 16 | 71 | 4 | A | 0.026 | 1319 |
| Example 17 | 75 | 10 | B | 0.055 | 1196 |
| Comparative Example 2 | 64 | 10 | C | 0.072 | 1490 |
| Comparative Example 3 | 63 | 10 | C | 0.073 | 1502 |

We claim:
1. A method of making a magnetic record medium, comprising the steps of:
  i) texturing a surface of a non-magnetic substrate to form a textured substrate;
  ii) electrolyzing said surface of said textured substrate in an electrolyte of an acid solution, by applying an electric potential on said non-magnetic substrate, to remove protrusions and burrs from said surface of said textured substrate to form an electrolyzed substrate; and
  iii) forming an undercoating layer and a magnetic layer on a surface of said electrolyzed substrate.

2. The method of claim 1, wherein said textured substrate has a mean surface roughness of not less than 20 Å.

3. The method of claim 1, wherein said textured substrate has a mean surface roughness of from 30 through 300 Å.

4. The method of claim 1, wherein said textured substrate has a mean surface roughness of from 30 through 150 Å.

5. The method of claim 1, wherein electrolyzing is performed for from 1–400 seconds at a quantity of electricity in the range of 10–1000 mA·sec/cm$^2$.

6. The method of making a magnetic record medium according to claim 1, wherein the electrolyte is an acidic solution of at least one selected from the group consisting of sulfuric acid, nitric acid, hydrochloric acid, chromic acid, phosphoric acid, oxalic acid, and acetic acid.

7. The method of making a magnetic record medium according to claim 6, wherein the electrolyte is an aqueous solution of phosphoric acid.

8. The method of making a magnetic record medium according to claim 1, wherein the electrolyte is an acidic aqueous solution having a concentration in a range of 0.5 through 40 weight %.

9. The method of making a magnetic record medium according to claim 1, wherein electrolyzing the surface of the textured substrate is performed by applying an electric potential to form a direct current on the nonmagnetic substrate.

10. The method of making a magnetic record medium according to claim 1, wherein electrolyzing the surface of the textured substrate is performed by applying an electric potential to form an alternating waveform current whereby polarities are alternately reversed on the nonmagnetic substrate.

11. The method of making a magnetic record medium according to claim 10, wherein alternating waveform is rectangular.

12. The method of making a magnetic record medium according to claim 1, wherein electrolyzing the surface of the textured substrate is performed by applying an electric potential to form an alternating waveform current having a frequency of not smaller than 0.1 and smaller than 500 Hz on the nonmagnetic substrate.

13. The method of making a magnetic record medium according to claim 1, wherein electrolyzing the surface of the textured substrate is performed by applying an electric potential to form a current in a range of a current density of not smaller than 0.1 and not larger than 50 mA/cm$^2$ on the nonmagnetic substrate.

14. The method of making a magnetic record medium according to claim 9, wherein electrolyzing the surface of the textured substrate is performed by applying an electric potential to form a current in a range of a current density of not smaller than 1.0 and not larger than 25 mA/cm$^2$ on the nonmagnetic substrate.

15. The method of making a magnetic record medium according to claim 10, wherein electrolyzing the surface of the textured substrate is performed by applying an electric potential to form a current in a range of a current density of not smaller than 0.5 and not larger than 45 mA/cm$^2$ on the nonmagnetic substrate.

16. The method of making a magnetic record medium according to claim 1, wherein electrolyzing the surface of the textured substrate is performed by applying an electric potential to form a current in a range of a quantity of electricity of not smaller than 10 and not larger than 1000 mA·second/cm$^2$ on the nonmagnetic substrate.

17. The method of making a magnetic record medium according to claim 1, wherein electrolyzing the surface of the textured substrate is performed at a temperature of an electrolyte in a range of 10° through 70° C.

* * * * *